(12) United States Patent
Pantos

(10) Patent No.: US 9,736,266 B2
(45) Date of Patent: Aug. 15, 2017

(54) RAPID DATA ACQUISITION OVER THE INTERNET

(71) Applicant: Apple Inc., Cupertino, CA (US)

(72) Inventor: Roger Pantos, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/131,936

(22) Filed: Apr. 18, 2016

(65) Prior Publication Data

US 2016/0269505 A1 Sep. 15, 2016

Related U.S. Application Data

(60) Continuation of application No. 14/531,859, filed on Nov. 3, 2014, now Pat. No. 9,319,345, which is a division of application No. 13/865,444, filed on Apr. 18, 2013, now Pat. No. 8,880,647, which is a division of application No. 12/163,118, filed on Jun. 27, 2008, now Pat. No. 8,429,286.

(60) Provisional application No. 60/937,866, filed on Jun. 28, 2007.

(51) Int. Cl.
| | |
|---|---|
| H04L 12/911 | (2013.01) |
| H04L 29/08 | (2006.01) |
| H04L 12/721 | (2013.01) |
| G06F 17/30 | (2006.01) |
| H04L 29/06 | (2006.01) |

(52) U.S. Cl.
CPC .............. *H04L 67/32* (2013.01); *H04L 45/12* (2013.01); *H04L 47/70* (2013.01); *H04L 67/02* (2013.01); *H04L 67/06* (2013.01); *H04L 67/10* (2013.01); *G06F 17/3038* (2013.01); *H04L 63/10* (2013.01)

(58) Field of Classification Search
CPC ......... H04L 63/10; H04L 67/06; H04L 67/10; G06F 17/3038
USPC ........ 709/223, 224, 203, 217, 219, 230, 231
See application file for complete search history.

(56) References Cited

U.S. PATENT DOCUMENTS

| | | | |
|---|---|---|---|
| 6,105,029 A | 8/2000 | Maddalozzo, Jr. et al. | |
| 6,137,777 A | 10/2000 | Vaid et al. | |
| 6,323,846 B1 | 11/2001 | Westerman et al. | |
| 6,339,785 B1 | 1/2002 | Feigenbaum | |
| 6,381,709 B1 | 4/2002 | Casagrande et al. | |
| 6,389,473 B1 | 5/2002 | Carmel et al. | |
| 6,910,078 B1 * | 6/2005 | Raman .............. | H04L 29/06027 709/231 |
| 7,165,095 B2 | 1/2007 | Sim | |
| 7,272,645 B2 | 9/2007 | Chang et al. | |
| 7,631,098 B2 | 12/2009 | Boutboul et al. | |
| 7,765,307 B1 | 7/2010 | Kritov et al. | |
| 7,921,217 B2 | 4/2011 | Yan et al. | |
| 8,180,857 B2 | 5/2012 | Son | |
| 8,224,981 B2 | 7/2012 | Vardi et al. | |
| 8,429,286 B2 | 4/2013 | Pantos | |

(Continued)

*Primary Examiner* — Lashonda Jacobs
(74) *Attorney, Agent, or Firm* — Sterne, Kessler, Goldstein & Fox, PLLC

(57) ABSTRACT

The present invention includes apparatuses, methods, computer readable media and systems comprising means for rapid data acquisition from a server are discussed herein. This rapid data acquisition can be achieved using a combination of bulk data requests and small data requests. A hybrid approach that uses simultaneous bulk and small data requests can provide random access to data files while achieving the high download speeds of a large data transfer.

23 Claims, 5 Drawing Sheets

(56) References Cited

U.S. PATENT DOCUMENTS

| | | |
|---|---|---|
| 8,495,166 B2 | 7/2013 | Perantatos et al. |
| 8,615,630 B2 | 12/2013 | Pantos et al. |
| 8,880,647 B2 | 11/2014 | Pantos |
| 9,319,345 B2 | 4/2016 | Pantos |
| 2002/0077909 A1 | 6/2002 | Kanojia et al. |
| 2002/0122427 A1 | 9/2002 | Kamentsky et al. |
| 2003/0031176 A1 | 2/2003 | Sim |
| 2003/0108340 A1* | 6/2003 | Yamashita ............. G11B 20/10 386/231 |
| 2005/0198238 A1 | 9/2005 | Sim et al. |
| 2006/0161872 A1* | 7/2006 | Rytivaara ............ H04L 12/5895 715/864 |
| 2006/0212542 A1 | 9/2006 | Fang et al. |
| 2007/0152983 A1 | 7/2007 | McKillop et al. |
| 2007/0288484 A1 | 12/2007 | Yan et al. |
| 2008/0147876 A1 | 6/2008 | Campbell et al. |
| 2008/0212937 A1* | 9/2008 | Son ........................ G06Q 30/02 386/241 |
| 2009/0006736 A1 | 1/2009 | Pantos et al. |
| 2009/0043908 A1* | 2/2009 | Masunaga ............ G11B 27/105 709/231 |
| 2011/0264759 A1 | 10/2011 | Perantatos et al. |

\* cited by examiner

RAPID DATA ACQUISITION OVER THE INTERNET

RELATED APPLICATIONS

This application is a continuation of U.S. patent application Ser. No. 14/531,859, filed Nov. 3, 2014, now U.S. Pat. No. 9,319,345, which is a divisional of U.S. patent application Ser. No. 13/865,444, filed on Apr. 18, 2013, now U.S. Pat. No. 8,880,647, which is a divisional of U.S. patent application Ser. No. 12/163,118, filed on Jun. 27, 2008, now U.S. Pat. No. 8,429,286, which claims priority to U.S. Provisional Patent Application No. 60/937,866, filed on Jun. 28, 2007, now expired, all of which are herein incorporated by reference in their entireties.

FIELD OF THE INVENTION

This generally relates to rapid data acquisition from a server.

BACKGROUND OF THE INVENTION

It may be desirable for a client device to rapidly access data files located on a server. High-quality access of data files over the Internet may require the ability to download data as fast as it is being consumed by a client device (or faster, to provide a margin of safety).

Current hypertext transfer protocol (HTTP) implementations support byte-range requests, which can permit a client device to submit a large number of relatively small data requests (e.g., 64K bytes). While this data acquisition method can be used to provide a client device with the ability to randomly access a data file stored on a server without requiring the entire data file to be downloaded, such a scheme can multiply the cost of network latency, thereby compromising download speed.

One of the most well-supported ways to download data over the public Internet is to use HTTP over transmission control protocol (TCP). TCP has built in adaptive congestion control mechanisms to efficiently transmit data to the client device responsive to requests for large amounts of data. Given a large amount of data to transmit to a client device using TCP, a server can progressively increase the transfer rate until the bandwidth limit of the connection is reached. Unfortunately, HTTP/TCP bulk transfer is not optimized for small byte-range requests since the use of many small requests to transfer data multiplies the per-request cost of network latency.

SUMMARY OF THE INVENTION

In accordance with the present invention, methods, apparatuses, computer readable media and other means for rapid data acquisition from a server are discussed herein. This rapid data acquisition can be achieved using a combination of bulk data requests and small data requests.

A single bulk data request or a small number of bulk data requests can reap the advantages of communication protocols that are optimized for transmitting large amounts of data. This can reduce network latency and server load. For example, asking for a large amount of data in a single data request using HTTP/TCP can allow TCP congestion control measures (which start out conservatively) to kick in and optimize the data transfer rate for a client's particular connection. A single bulk data request or a small number of bulk data requests using HTTP/TCP can be one of the fastest ways to download data over the public Internet.

Of course, a client device occasionally may issue a read request for data that has yet to be downloaded in response to a bulk data request. When this happens, the client device can be configured to service the read request using an approach that permits the client device to randomly access data from the server while still achieving high download speeds. For example, the present invention can use a hybrid approach that exploits the adaptive congestion control mechanisms of TCP with the ability of HTTP to manage byte-range requests of data. This can permit a client device of the present invention to provide random access to data files while achieving the high download speeds of large TCP data transfers.

In one embodiment of the present invention, a client device can issue both bulk data requests and small data requests for different portions of the same data file. The bulk data requests can request transmission of bulk data using a communication protocol that is optimized therefor. To avoid network latency costs associated with redirecting the server when it is acting on a bulk data request, the client device can simultaneously issue one or more small data requests to request transmission of specific small data ranges using a communication protocol that is suited for random access of data in the server data file.

In some embodiments of the present invention, in response to a read request for a portion of a data file that is not currently stored in a client device's memory, the client can issue a bulk data request for that file. If there is already a bulk data request pending for the data file, the client device can either wait for the requested portion of the data file to be received from the pending bulk data request; issue a new data request (e.g., a bulk data request or a small data request) for the requested portion of the data file while the original data request is still pending; or stop the pending bulk data request and issue one or more new data requests. The option selected by the client may be based on when the requested portion of data will be received from the pending bulk data request. The option selected by the client may also be based on whether the requested portion of data is more important than the data being received from the pending bulk data request.

In one embodiment of the present invention, a client device can use a single communications protocol to issue both the bulk and small data requests. In one embodiment of the present invention, a bulk data request can request an amount of data that can be at least an order of magnitude greater than that requested using a small data request.

In some embodiments of the present invention, the number of simultaneous data requests for a data file can be limited to avoid overloading the server with too many data requests. For example, the number of simultaneous data requests can be limited to one bulk data request and one small data request, one bulk data request and a fixed number of small data requests, or a fixed number of bulk data requests and small data requests.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION OF THE INVENTION

The present invention can include systems and methods that provide more efficient random access to remotely-stored data files while achieving high download speeds. When used in the context of Internet data transmissions, the high download speeds can be similar to that of large HTTP/TCP transfers.

The present invention can be used by any device to download any data file stored on a server. For example, the present invention can be used to download any data file having one or more of the following characteristics: (1) the data file is large (e.g., over a gigabyte); (2) a large portion or all of the data file will eventually be accessed by the client device; (3) the order in which the data is stored in the data file corresponds well to the order in which the data will be accessed by the client device (e.g., bytes of data that are to be accessed in close temporal proximity are clustered together in the data file). For example, the present invention can be used by a media player to download media files stored on a server over the Internet.

Figure 1:
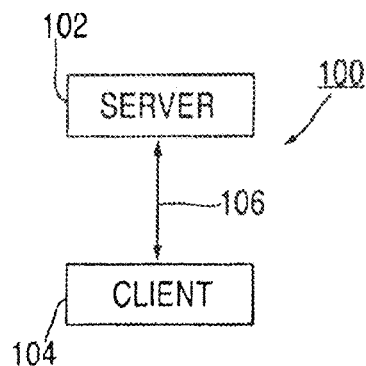
FIG. 1 illustrates a schematic view of an illustrative data system in accordance with one embodiment of the present invention.

FIG. 1 illustrates a schematic view of an illustrative data system in accordance with one embodiment of the present invention. Data system 100 can include server 102 and client device 104. In some embodiments, data system 100 may include several servers 102 and several client devices 104. To avoid overcomplicating the drawing however, only one server 102 and one client device 104 is shown in FIG. 1.

Server 102 can store data files that client device 104 wants to access. To affect a data exchange, client device 104 can issue one or more data download requests (also referred to herein as data requests and download requests) to server 102. Responsive thereto, server 102 can locate and transmit the requested data. Server 102 and client device 104 may communicate over communications link 106. Communications link 106 may include any suitable wired or wireless communications link, or combinations thereof, by which data may be exchanged between server 102 and client 104. For example, communications link 106 may include a satellite link, a fiber-optic link, a cable link, an Internet link, or any other suitable wired or wireless link. Communications link 106 may transmit data using any suitable communications protocol supported by the medium of communications link 106. Such communications protocols may include, for example, Wi-Fi (e.g., a 802.11 protocol), Ethernet, Bluetooth (registered trademark), high frequency systems (e.g., 900 MHz, 2.4 GHz, and 5.6 GHz communication systems), infrared, TCP/IP (e.g., and the protocols used in each of the TCP/IP layers), HTTP, BitTorrent, FTP, RTP, RTSP, SSH, any other communications protocol, or any combination thereof.

Server 102 can include any suitable server for providing data to client device 104. For example, server 102 can include a file server, a database server, a web server, an FTP server, a VPN server, a proxy server, or any other server operative to provide data to client device 104. In some embodiments, server 102 can include a media server operative to provide media to client device 104 (e.g., a media server, e.g., a YouTube server, operative to provide media files to a client device).

Client device 104 can include any electronic device operative to communicate with a server. For example, client device 104 may include a media player such as an iPod™ marketed by Apple Inc., of Cupertino, Calif., a cellular telephone such as an iPhone™ marketed by Apple Inc., pocket-sized personal computers such as an iPAQ Pocket PC available by Hewlett Packard Inc., of Palo Alto, Calif., personal digital assistants (PDAs), a desktop computer, a laptop computer, and any other device capable of communicating via wires or wirelessly (with or without the aid of a wireless enabling accessory system).

Figure 2:
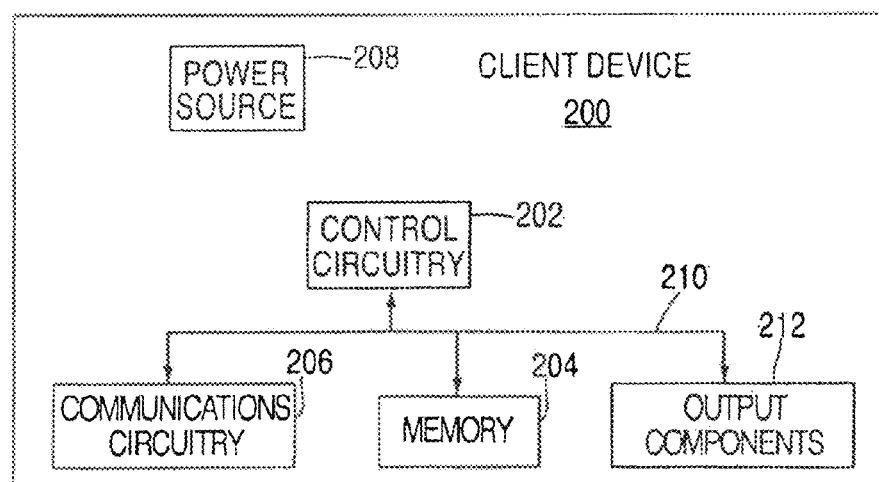
FIG. 2 illustrates a simplified block diagram of an illustrative client device in accordance with one embodiment of the present invention.

FIG. 2 illustrates a simplified block diagram of an illustrative client device in accordance with one embodiment of the present invention. Client device 200 can include control circuitry 202, memory 204, communications circuitry 206, power supply 208, bus 210, and input/output circuitry 212. In some embodiments, client device 200 can include more than one of each component, but for the sake of illustration, only one is shown in FIG. 2.

Memory 204 can include one or more storage mediums, including for example, a hard-drive, flash memory, permanent memory such as ROM, semi-permanent memory such as RAM, any other suitable type of storage component, or any combination thereof. Memory 204 can include cache memory, which may be one or more different types of memory used for temporarily storing data for electronic device applications. Memory 204 may store media (e.g., music and video files), software (e.g., for implementing functions on device 200), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 200 to establish a wireless connection), subscription information (e.g., information that keeps track of podcasts or television shows or other media a user subscribes to), contacts information (e.g., telephone numbers and email address), calendar information, any other suitable data, or any combination thereof.

Communications circuitry 206 can permit device 200 to communicate with one or more servers (e.g., server 102 of FIG. 1) using any suitable communications protocol. For example, communications circuitry 206 may support Wi-Fi (e.g., a 802.11 protocol), Ethernet, Bluetooth (registered trademark), high frequency systems (e.g., 900 MHz, 2.4 GHz, and 5.6 GHz communication systems), infrared, TCP/IP (e.g., and the protocols used in each of the TCP/IP layers), HTTP, BitTorrent, FTP, RTP, RTSP, SSH, any other communications protocol, or any combination thereof.

In some embodiments, client device 200 can be equipped with input/output (I/O) circuitry 212 for accepting data into and outputting data from the device. For example, I/O circuitry 212 can include electronic circuitry for outputting audio, visual, or audio-visual signals to a user. This can include, e.g., a coder/decoder (CODEC) to convert digital media signals into analog signals, a display, speakers, or any combination thereof. I/O circuitry 212 also can include user input circuitry that allow a user to interact or interface with client device 200. For example, the user interface can take a variety of forms, such as a button, electronic device pad, dial, a click wheel, a touch screen, or any combination thereof. The user interface may include a multi-touch screen such as that described in U.S. Pat. No. 6,323,846, which is incorporated by reference herein in its entirety. The user interface may emulate a rotary phone or a multi-button electronic device pad, which may be implemented on a touch screen or the combination of a click wheel or other user input device and a screen. A more detailed discussion of such a rotary phone interface may be found, for example, in U.S. patent application Ser. No. 11/591,752, filed Nov. 1, 2006, entitled "Touch Pad with Symbols based on Mode," which is incorporated by reference herein in its entirety.

Bus 210 can provide a data transfer path for transferring data to, from, or between control circuitry 202, memory 204, communications circuitry 206, and input/output circuitry 212.

Power supply 208 can provide power to device 200. In some embodiments, power supply 208 can be coupled to a power grid (e.g., a personal computer). In some embodiments, power supply 208 can include one or more batteries for providing power in a portable device. As another example, power supply 208 can be configured to generate power in a portable device from a natural source (e.g., solar power using solar cells).

A client device that wishes to access a particular file over a network can create a data download stream by issuing data requests to the server. In one embodiment of the present invention, the client device can issue up to two types of data requests at any given time: a bulk data request and a small data request.

Bulk data requests can be for as much as an entire data file. In one embodiment of the present invention, a client device can issue a bulk data request to retrieve a data range that starts at a requested data byte of a data file and ends with a data byte located at or near the end of the data file. The client device also can issue a bulk data request to retrieve a data range that starts at a requested data byte and ends with the next data byte that already is stored in the client device's memory. This can prevent download of duplicative data.

A single bulk data request or a small number of bulk data requests can reap the advantages of communication protocols that are optimized for transmitting large amounts of data. This can reduce network latency and server load. For example, asking for a large amount of data in a single data request using HTTP/TCP can allow TCP congestion control measures (which start out conservatively) to kick in and optimize the data transfer rate for a client's particular connection. A single bulk data request or a small number of bulk data requests using HTTP/TCP can be one of the fastest ways to download data over the public Internet.

Of course, the client device occasionally may issue a read request for data that has yet to be downloaded in response to a bulk data request. When this happens, the client device can be configured to service the read request using an approach that permits the client device to randomly access data from the server while still achieving high download speeds. For example, the present invention can use a hybrid approach that exploits the adaptive congestion control mechanisms of TCP with the ability of HTTP to manage byte-range requests of data. This can permit a client device of the present invention to provide random access to data files while achieving the high download speeds of large TCP data transfers.

In one embodiment of the present invention, control circuitry 202 can issue both bulk download requests and small download requests over communication circuitry 206. The bulk download requests can request transmission of bulk data using a communication protocol that is optimized therefor. To avoid network latency costs associated with redirecting the server when it is acting on a bulk data request, the client device can simultaneously issue one or more small download requests to request transmission of specific small data ranges using a communication protocol that is suited for random access of data in the server data file.

In one embodiment of the present invention, client device 200 can use a single communications protocol to issue both the bulk and small download requests, such as, for example, HTTP over TCP. As discussed above, HTTP can permit client device 200 to issue small byte-range data requests and thereby facilitate random access of data files, and TCP can execute congestion control to quickly and efficiently transfer bulk data streams. In one embodiment of the present invention, a bulk data download request can request an amount of data that can be at least an order of magnitude greater than that requested using a small data download request.

Figure 3:
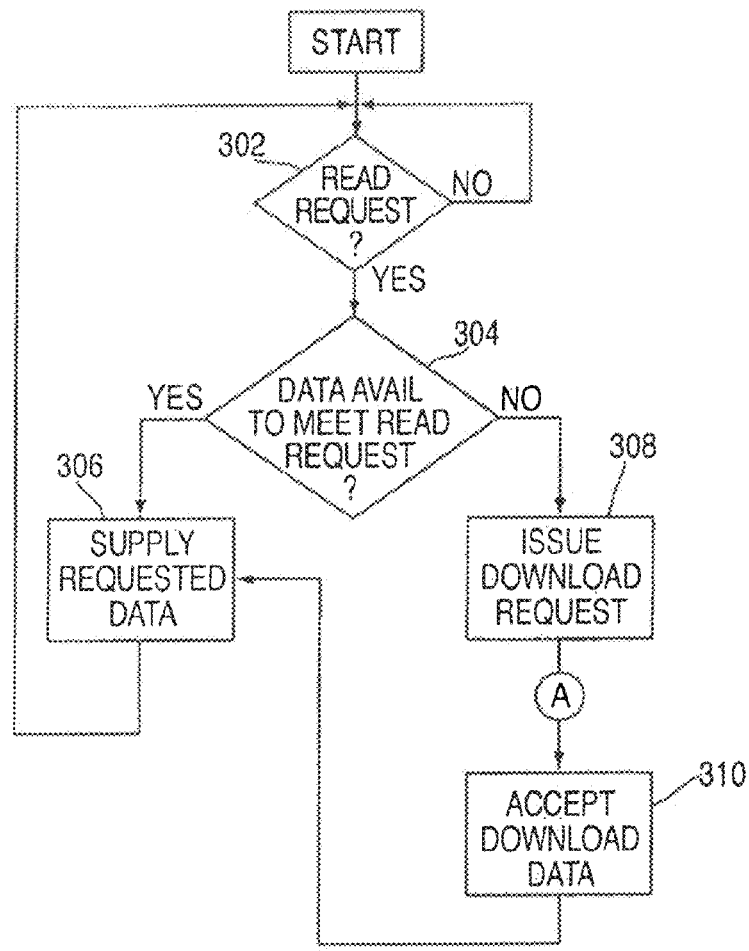
FIG. 3 is a flowchart of an illustrative process for acquiring and/or supplying data responsive to a read request in accordance with one embodiment of the present invention.

FIG. 3 is a flowchart of an illustrative process for acquiring and/or supplying data responsive to a read request in accordance with one embodiment of the present invention. In step 302, a client device can determine whether it has received a read request (a request to access data). The read request can be issued by a component of the client device itself or another device coupled to the client device. If the client device determines that it has received a read request, in step 304, the client device can determine whether the requested data is available. For example, the client device can search its memory to attempt to locate the requested data. If the requested data is available, the client device can supply the requested data in step 306. However, if the requested data is unavailable, the client device can issue a data download request to the server in step 308. This step is discussed in greater detail below with respect to FIGS. 4-6. The server then can act on the data download request and transmit the requested data to the client device. In step 310, the client device can accept the data stream transmitted by the server and thereafter supply the requested data to the issuer of the read request. The requested data can be stored in cache or immediately consumed. For example, when the data is retrieved from a media file, the data can be immediately consumed by output circuitry that present the media data to a user.

Figure 4:
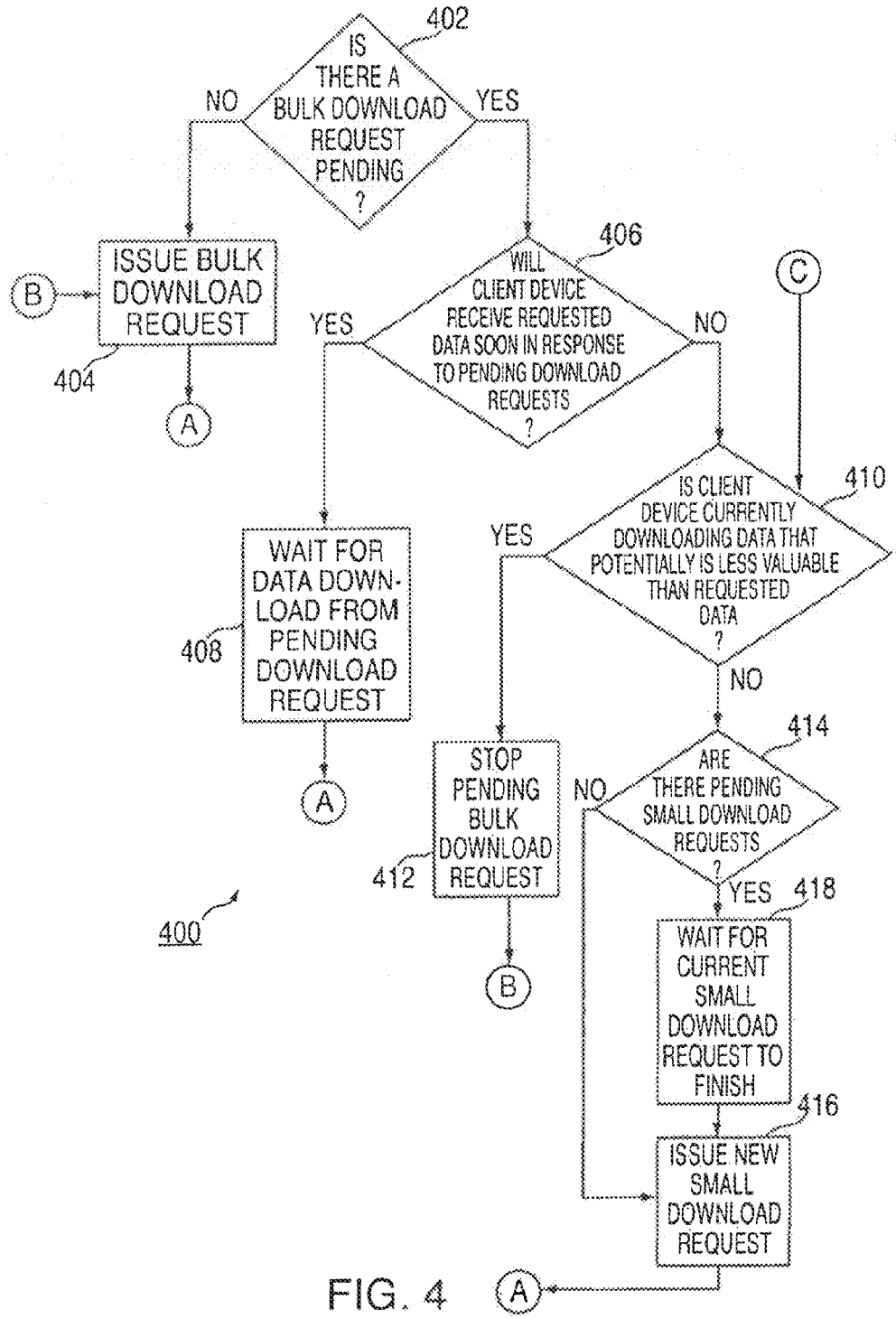
FIG. 4 is a flowchart of an illustrative process for issuing data download requests in accordance with one embodiment of the present invention.

FIG. 4 is a flowchart of an illustrative process for issuing data download requests in accordance with one embodiment of the present invention. One or more steps discussed with respect to FIG. 4 can replace step 308 of FIG. 3.

At step 402, in response to a read request for data that is not currently stored in the client device's memory, the client device can determine whether it has a current bulk download request pending. If there is not such a request pending, the client device can issue a new bulk download request to the server for the requested data in step 404. Once the download request has been issued to the server, the server can retrieve the requested data and transmit the requested data back to the client device. Thereafter, at step 310 of FIG. 3, the client device can accept the requested data.

However, if there is a bulk download request pending, in step 406, the client device can determine whether it will receive the requested data soon. To determine whether it will receive the requested data soon, the client device can evaluate one or more of the following parameters: time until the requested data will be downloaded, time at which the client device wants to consume the requested data, download speed, cached data, location of playhead or anchor (as described in greater detail below), network latency, data block sizes, any other appropriate parameter, and any combination thereof.

If the client device determines that the requested data will be downloaded soon, the client device can wait for the download without issuing any additional data request (step 408). However, if the client device determines that the requested data will not be downloaded soon, the client device can proceed to step 410.

In step 410, the client device can determine whether, in response to the currently pending bulk download request, it is retrieving data that potentially is less valuable than the data requested in step 302 of FIG. 3. This can be determined by evaluating one or more of the following parameters: information provided by the user, information provided by the history of client requests, anchor or playhead position, any other suitable parameter, or any combination thereof. For example, the user may indicate the desire for the requested data by fast-forwarding or rewinding media being played back. In that case, the data requested in step 302 may potentially be more valuable than the data currently being downloaded in response to the currently pending bulk download request. The client request history may indicate trends in previous client read requests and/or client download requests. In one embodiment of the present invention, the value of data can be assessed relative to an anchor or playhead position, which can be determined based on the history of client read and/or download requests. The anchor can model the playback or access of the data file by the client device. Thus, its position can be dynamically adjusted based on the playback or access. In one embodiment, the client device may assign a higher value to data located ahead of the anchor and a lower value to data located behind the anchor, with the highest value assigned to data located in the vicinity of the anchor. This is discussed in greater detail in concurrently-filed U.S. Patent Application No. 60/937,877, filed Jun. 28, 2007, entitled "SYSTEMS AND METHODS FOR MANAGING DATA STORAGE", which is incorporated herein by reference in its entirety.

If the data requested in step 302 is more valuable than the data currently being downloaded (e.g., is assigned a higher value than that of the data currently being downloaded), the client device can stop or cancel the currently pending bulk download request in step 412. Thereafter, the client device can proceed onto step 404 and issue a new bulk download request. This new request then can create a data stream from the server to download the data requested in step 302.

However, if the data requested in step 302 is less valuable than the data currently being downloaded (e.g., is assigned a lower value than that of the data currently being downloaded), the client device then can check whether there is a small download request pending in step 414. If there is no small download request pending, the client device can immediately issue a new small download request to the server in step 416 to retrieve the data requested in step 302. However, if there is a small download request pending, the client device can wait for the pending request to be completed (step 418) before it issues a new small download request to the server in step 416. Alternatively, rather than waiting for the pending request to be completed, the client device can immediately issue a new small download request to the server. However, by waiting for a pending small data request to be completed, the client device can reduce contentions for the data stream pipeline and reduce server load, thereby resulting in faster overall download speed.

Once the download request has been issued to the server, the server can retrieve the requested data and transmit the requested data back to the client device. Thereafter, at step 310 of FIG. 3, the client device can accept the requested download data.

Figure 5:
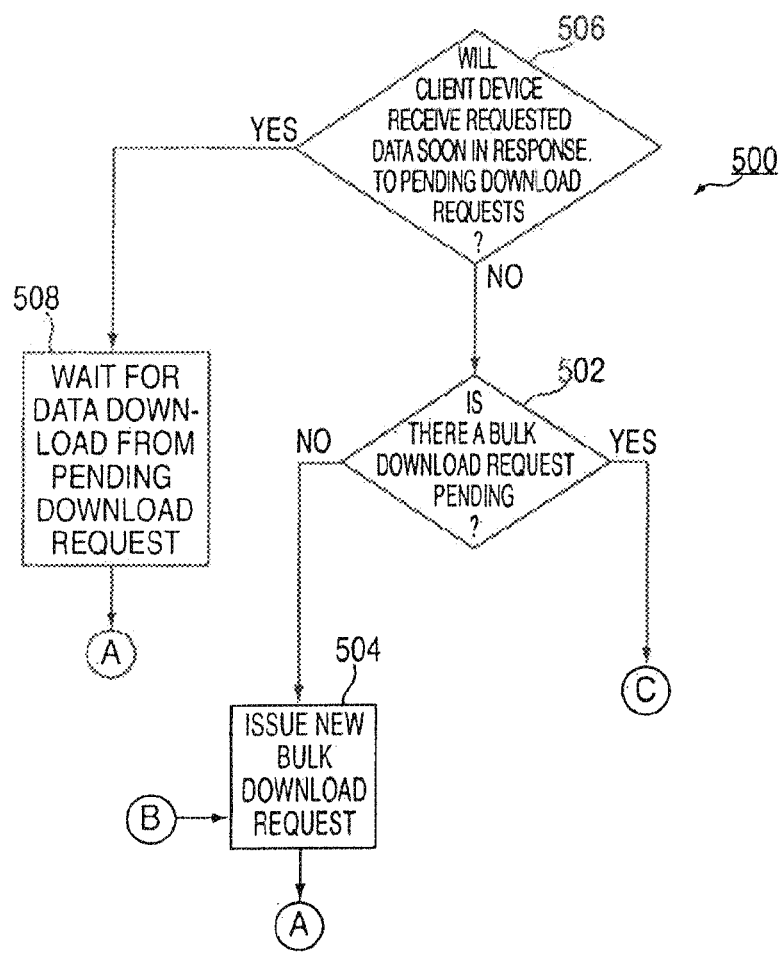
FIG. 5 is a flowchart of an illustrative process for issuing data download requests in accordance with a second embodiment of the present invention.

FIG. 5 is a flowchart of an illustrative process for issuing data download requests in accordance with a second embodiment of the present invention. Process 500 can be similar to process 400 of FIG. 4, except that, in process 500, the client device can switch the sequence in which it performs steps 402 and 406. That is, in process 500, the client device can first determine whether it will receive the requested data soon (step 506), before it determines whether it has a current bulk download request pending (step 502). If the client device determines that the data requested in step 302 of FIG. 3 will not be downloaded soon and there is a bulk download request pending, the client device then can proceed to point C in FIG. 4 (step 410). Otherwise, if the client device determines that there is no bulk download request pending (step 502), the client device can issue a new bulk download request (step 504). If at step 506, the client device determines that the client device will receive the requested data soon, the client device waits for a data-download from the pending download request (step 508).

Figure 6:
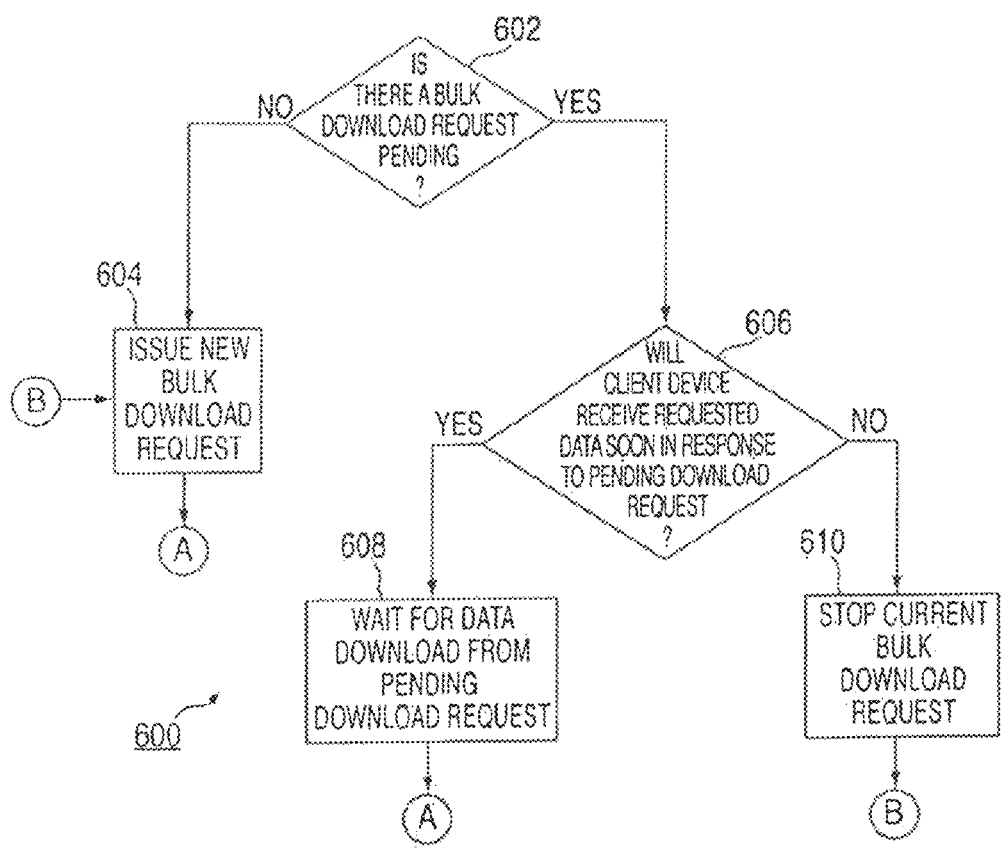
FIG. 6 is a flowchart of an illustrative process for issuing data download requests in accordance with a third embodiment of the present invention.

FIG. 6 is a flowchart of an alternative illustrative process for issuing data download requests in accordance with a third embodiment of the present invention. Process 600 can be similar to processes 400 and 500 of FIGS. 4 and 5, except that, in process 600, the client device may issue only bulk download requests. This may occur, for example, when the control circuitry of the client device does not have the capacity to issue small download requests, or when the capacity to issue small download requests is not turned on. This also may occur, for example, when the client device determines at the outset that the data requested in step 304 is more valuable than the data of any other currently pending data request (e.g., the user has indicated a desire for the requested data).

At step 602, in response to a read request for data that is not currently stored in the client device's memory, the client device can determine whether it has a current bulk download request pending. If there is not, the client device can issue a new bulk download request to the server in step 604 for the requested data. Once the download request has been issued to the server, the server can retrieve the requested data and transmit the requested data back to the client device. Thereafter, at step 310 of FIG. 3, the client device can accept the requested download data.

However, if there is a bulk download request pending, in step 606, the client device can determine whether it will receive the requested data soon. If the client device determines that the requested data will be downloaded soon, the client device can wait for the download without issuing any additional data request (step 608). However, if the client device determines that the requested data will not be downloaded soon, the client device can stop the current bulk download request in step 610 and thereafter proceed to step 604 to issue a new bulk download request to the server.

The above described embodiments of the present invention are presented for purposes of illustration and not of limitation. For example, while FIG. 2 illustrates a memory having cache, a client device of the present invention does not have to cache data that it requests and receives from the server. Instead, the data can be immediately consumed (e.g., by input/output circuitry 212). Also, a client device of the present invention can issue or have pending multiple bulk and/or small data download requests for the server. Only the claims that follow are meant to set bounds as to what the present invention includes.

What is claimed is:

1. A method for streaming data, comprising:
    receiving a request to access content associated with a point in the streaming data;
    determining that the content associated with the point is more important than content associated with a bulk data transfer, wherein the content associated with the bulk data transfer comprises at least a portion of the content associated with the point;
    stopping the bulk data transfer in response to the determining; and
    issuing a request to a server for the content associated with the point in the streaming data.

2. The method of claim 1, wherein the determining comprises:
    determining a first value of the content associated with the point, wherein the first value is based at least in part on user data or a location of a playhead position;
    determining a second value of content associated with the bulk data transfer, wherein the second value is based at least in part on the user data or the location of the playhead position; and
    determining that the first value is higher than the second value.

3. The method of claim 2, wherein the location of the playhead position is based at least in part on a history of client read requests or a history of client download requests.

4. The method of claim 1, wherein the content associated with the point in the streaming data is based at least in part on data associated with a fast forward operation on the streaming data or a rewind operation on the streaming data.

5. The method of claim 1, wherein the issuing the request comprises:
    issuing another bulk data request to the server for the content associated with the point in the streaming data.

6. The method of claim 1, wherein an amount of data associated with the bulk data transfer is an order of magnitude greater than an amount of data associated with a non-bulk data request.

7. The method of claim 1, wherein the content associated with the point is more important than the content associated with the bulk data transfer when the content associated with the point is to be consumed prior to the content associated with the bulk data transfer.

8. The method of claim 1, further comprising:
    determining that the content associated with the point in the streaming data will not be downloaded via the bulk data transfer within a period of time.

9. A method for streaming data, comprising:
    receiving a request to access content associated with a point in the streaming data;
    determining that the content associated with the point is less valuable than content associated with a bulk data transfer, wherein the content associated with the bulk data transfer comprises at least a portion of the content associated with the point; and
    issuing a non-bulk data request to a server for the content associated with the point in the streaming data in response to the determining, wherein the bulk data transfer is allowed to proceed.

10. The method of claim 9, wherein the determining comprises:
    determining a first value of the content associated with the point, wherein the first value is based at least in part on user data or a location of a playhead position;
    determining a second value of content associated with the bulk data transfer, wherein the second value is based at least in part on the user data or the location of the playhead position; and
    determining that the first value is lower than the second value.

11. The method of claim 10, wherein the location of the playhead position is based at least in part on a history of client read requests or a history of client download requests.

12. The method of claim 9, wherein the content associated with the point in the streaming data is based at least in part on data associated with a fast forward operation on the streaming data or a rewind operation on the streaming data.

13. The method of claim 9, wherein an amount of data associated with the bulk data transfer is an order of magnitude greater than an amount of data associated with the non-bulk data request.

14. A client computing device, comprising:
    control circuitry; and
    communications circuitry;
    the control circuitry and communications circuitry configured to:
        receive a request to access content associated with a point in the streaming data;
        determine a first value of the content associated with the point, wherein the first value is based at least in part on user data or a location of a playhead position;
        determine a second value of content associated with a bulk data transfer, wherein the content associated with the bulk data transfer comprises at least a portion of the content associated with the point, and the second value is based at least in part on the user data or the location of the playhead position;
        determine that the first value is higher than the second value;
        stop the bulk data transfer in response to the determination that the first value is higher than the second value; and
        issue a request to a server for the content associated with the point in the streaming data.

15. The client computing device of claim 14, wherein the location of the playhead position is based at least in part on a history of client read requests or a history of client download requests.

16. The client computing device of claim 14, wherein the content associated with the point in the streaming data is based at least in part on data associated with a fast forward operation on the streaming data or a rewind operation on the streaming data.

17. A client computing device, comprising:
    control circuitry; and
    communications circuitry;
    the control circuitry and communications circuitry configured to:
        receive a request to access content associated with a point in the streaming data;
        determine a first value of the content associated with the point, wherein the first value is based at least in part on user data or a location of a playhead position;
        determine a second value of content associated with a bulk data transfer, wherein the content associated with the bulk data transfer comprises at least a portion of the content associated with the point, and the second value is based at least in part on the user data or the location of the playhead position;

determine that the first value is lower than the second value; and issue a non-bulk data request to a server for the content associated with the point in the streaming data in response to the determination that the first value is lower than the second value, wherein the bulk data transfer is allowed to proceed.

18. The client computing device of claim 17, wherein the location of the playhead position is based at least in part on a history of client read requests or a history of client download requests.

19. The client computing device of claim 17, wherein the content associated with the point in the streaming data is based at least in part on data associated with a fast forward operation on the streaming data or a rewind operation on the streaming data.

20. A non-transitory computer-readable storage medium storing instructions that, when executed by a computing device, cause the computing device to perform a method, the method comprising:

receiving a request to access content associated with a point in the streaming data;

determining a first value of the content associated with the point, wherein the first value is based at least in part on user data or a location of a playhead position;

determining a second value of content associated with a bulk data transfer, wherein the content associated with the bulk data transfer comprises at least a portion of the content associated with the point, and the second value is based at least in part on the user data or the location of the playhead position;

determining that the first value is lower than the second value; and issuing a non-bulk data request to a server for the content associated with the point in the streaming data in response to the determination that the first value is lower than the second value, wherein the bulk data transfer is allowed to proceed.

21. The non-transitory computer-readable storage medium of claim 20, wherein the location of the playhead position is based at least in part on a history of client read requests or a history of client download requests.

22. The non-transitory computer-readable storage medium of claim 20, wherein the content associated with the point in the streaming data is based at least in part on data associated with a fast forward operation on the streaming data or a rewind operation on the streaming data.

23. The non-transitory computer-readable storage medium of claim 20, wherein an amount of data associated with the bulk data transfer is an order of magnitude greater than an amount of data associated with the non-bulk data request.

* * * * *